US011837717B2

United States Patent
Kim et al.

(10) Patent No.: US 11,837,717 B2
(45) Date of Patent: Dec. 5, 2023

(54) NEGATIVE ELECTRODE ACTIVE MATERIAL FOR LITHIUM SECONDARY BATTERY AND METHOD OF PREPARING THE SAME

(71) Applicant: LG CHEM, LTD., Seoul (KR)

(72) Inventors: Hyun Chul Kim, Daejeon (KR); Yong Ju Lee, Daejeon (KR); Eun Kyung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 45 days.

(21) Appl. No.: 15/577,233

(22) PCT Filed: Sep. 23, 2016

(86) PCT No.: PCT/KR2016/010682
§ 371 (c)(1),
(2) Date: Nov. 27, 2017

(87) PCT Pub. No.: WO2017/052281
PCT Pub. Date: Mar. 30, 2017

(65) Prior Publication Data
US 2018/0151874 A1 May 31, 2018

(30) Foreign Application Priority Data
Sep. 24, 2015 (KR) .................. 10-2015-0135474

(51) Int. Cl.
*H01M 4/36* (2006.01)
*H01M 4/587* (2010.01)
(Continued)

(52) U.S. Cl.
CPC ............. *H01M 4/366* (2013.01); *B01J 13/04* (2013.01); *B01J 13/20* (2013.01); *H01M 4/133* (2013.01);
(Continued)

(58) Field of Classification Search
CPC ...... H01M 4/134; H01M 4/386; H01M 4/133; H01M 4/36; H01M 4/366; H01M 4/38;
(Continued)

(56) References Cited

U.S. PATENT DOCUMENTS 9,548,493 B2  1/2017  Yoo et al.
9,780,357 B2  10/2017  Lee et al.
(Continued)

FOREIGN PATENT DOCUMENTS

CN   102856541 A   1/2013
CN   103931027 A   7/2014
(Continued)

OTHER PUBLICATIONS

Extended European Search Report, dated May 30, 2018, for European Application No. 16849006.8.
(Continued)

*Primary Examiner* — Stewart A Fraser
*Assistant Examiner* — Lilia Nedialkova
(74) *Attorney, Agent, or Firm* — Birch, Stewart, Kolasch & Birch, LLP

(57) ABSTRACT

The present specification relates to a negative electrode active material which includes a silicon-based composite represented by $SiO_a$ ($0 \le a < 1$), and a carbon coating layer distributed on a surface of the silicon-based composite, and which has a bimodal pore structure including nanopores and mesopores. In a lithium secondary battery including the negative electrode active material, an oxygen content in the silicon-based composite can be controlled to improve initial efficiency and capacity characteristics, and a specific surface area can also be controlled, and thus a side reaction with electrolyte can be reduced.

5 Claims, 6 Drawing Sheets

(51) Int. Cl.

| | | |
|---|---|---|
| *H01M 4/134* | (2010.01) | |
| *H01M 10/052* | (2010.01) | |
| *H01M 4/38* | (2006.01) | |
| *H01M 4/48* | (2010.01) | |
| *H01M 10/0525* | (2010.01) | |
| *H01M 4/62* | (2006.01) | |
| *B01J 13/04* | (2006.01) | |
| *B01J 13/20* | (2006.01) | |
| *H01M 4/133* | (2010.01) | |

(52) U.S. Cl.
CPC ............ *H01M 4/134* (2013.01); *H01M 4/36* (2013.01); *H01M 4/38* (2013.01); *H01M 4/386* (2013.01); *H01M 4/483* (2013.01); *H01M 4/587* (2013.01); *H01M 4/625* (2013.01); *H01M 10/052* (2013.01); *H01M 10/0525* (2013.01)

(58) Field of Classification Search
CPC ...... H01M 4/483; H01M 4/587; H01M 4/625; H01M 10/052; H01M 10/0525; B01J 13/04; B01J 13/20; Y02E 60/10
See application file for complete search history.

(56) References Cited

U.S. PATENT DOCUMENTS

| | | | |
|---|---|---|---|
| 9,790,091 B2 | 10/2017 | Shon et al. | |
| 9,947,918 B2 | 4/2018 | Biswal et al. | |
| 9,947,922 B2 | 4/2018 | Yoo et al. | |
| 9,972,836 B2 | 5/2018 | Yang et al. | |
| 2008/0145757 A1 | 6/2008 | Mah et al. | |
| 2011/0159368 A1* | 6/2011 | Hirose | H01M 10/0525 429/231.8 |
| 2011/0165467 A1* | 7/2011 | Yew | H01M 2/1686 429/231.8 |
| 2012/0013051 A1 | 1/2012 | Mah et al. | |
| 2013/0004850 A1 | 1/2013 | Shon et al. | |
| 2013/0224599 A1* | 8/2013 | Park | H01M 4/0402 429/231.8 |
| 2013/0280614 A1 | 10/2013 | Lee et al. | |
| 2014/0141334 A1 | 5/2014 | Yoo et al. | |
| 2014/0193711 A1* | 7/2014 | Biswal | H01M 4/622 429/217 |
| 2015/0072240 A1 | 3/2015 | Yoo et al. | |
| 2015/0295232 A1* | 10/2015 | Watanabe | H01M 4/366 429/231.8 |
| 2015/0325839 A1* | 11/2015 | Put | H01M 4/366 252/182.1 |
| 2016/0028085 A1 | 1/2016 | Kim et al. | |
| 2016/0079591 A1 | 3/2016 | Yang et al. | |
| 2016/0197342 A1 | 7/2016 | Lee et al. | |
| 2016/0293935 A1 | 10/2016 | Biswal et al. | |

FOREIGN PATENT DOCUMENTS

| | | |
|---|---|---|
| CN | 104466185 A | 3/2015 |
| CN | 105189352 A | 12/2015 |
| CN | 105264654 A | 1/2016 |
| EP | 2 873 646 A1 | 5/2015 |
| EP | 2879216 A1 | 6/2015 |
| JP | 2013-225469 A | 10/2013 |
| JP | 2015-520725 A | 7/2015 |
| JP | 2016-506029 A | 2/2016 |
| JP | 2016-508114 A | 3/2016 |
| JP | 2016-522139 A | 7/2016 |
| KR | 10-1280546 B1 | 7/2013 |
| KR | 10-2013-0118191 A | 10/2013 |
| KR | 10-1345708 B1 | 12/2013 |
| KR | 10-2014-0056069 A | 5/2014 |
| KR | 10-2014-0070417 A | 6/2014 |
| KR | 10-2014-0091371 A | 7/2014 |
| KR | 10-2015-0026925 A | 3/2015 |
| KR | 10-2015-0050504 A | 5/2015 |
| TW | 201522220 A | 6/2015 |
| WO | WO 2015/030531 A1 | 3/2015 |

OTHER PUBLICATIONS

International Search Report for PCT/KR2016/010682 (PCT/ISA/210) dated Dec. 28, 2016.

\* cited by examiner

NEGATIVE ELECTRODE ACTIVE MATERIAL FOR LITHIUM SECONDARY BATTERY AND METHOD OF PREPARING THE SAME

CROSS-REFERENCE TO RELATED APPLICATION

This application claims priority to and the benefit of Korean Patent Application No. 10-2015-0135474 filed on Sep. 24, 2015, the disclosure of which is incorporated herein by reference in their entirety.

TECHNICAL FIELD

The present specification relates to a negative electrode active material for a lithium secondary battery which includes silicon-based composite, and a method of preparing the same.

BACKGROUND ART

Lithium secondary batteries, which have been recently spotlighted as a power source of portable and small electronic devices, may exhibit high discharge voltages that are two times or more than those of batteries using a typical alkaline aqueous solution by using an organic electrolyte solution, and thus exhibit high energy density.

Oxides, formed of lithium and a transition metal, which have a structure capable of intercalating lithium such as $LiCoO_2$, $LiMn_2O_4$, $LiNi_{1-x}Co_xO_2$ (0<x<1) and the like have been mainly used as a positive electrode active material of a lithium secondary battery, and various types of carbon-based materials including artificial graphite, natural graphite, and hard carbon, which are capable of intercalating and deintercalating lithium, have been used as a negative electrode active material.

Graphite is mainly used as a negative electrode material of the lithium secondary battery. However, graphite has a low capacity per unit mass of 372 mAh/g and it may be difficult to prepare a high-capacity lithium secondary battery using graphite.

As a negative electrode material exhibiting a higher capacity than graphite, a material forming an intermetallic compound with lithium, such as silicon, tin, and an oxide thereof, is promising. However, there is a problem in that volumes of the above-described materials expand because crystal structures thereof are changed when absorbing and storing lithium. When silicon absorbs and stores the maximum amount of lithium, the silicon is transformed into $Li_{4.4}Si$ and the volume thereof expands due to charging. In this case, as a rate of increase in volume by charging, the volume may expand up to about 4.12 times the volume of the silicon before the volume expansion.

Therefore, many studies on an increase in the capacity of a negative electrode material such as silicon have been conducted. However, since a metal such as silicon (Si), tin (Sn), aluminum (Al) or the like is reacted with lithium during charging and discharging, volume expansion and contraction occur, and thus cycle characteristics of the battery are degraded.

DISCLOSURE

Technical Problem

The present specification has been made in view of the above, and an object of the present specification is to provide a negative electrode active material for a lithium secondary battery capable of improving the initial efficiency and lifetime characteristics of the lithium secondary battery and preventing a side reaction with an electrolyte by controlling a specific surface area, and a preparation method thereof, and specifically, to provide a negative electrode active material including a silicon-based composite, eventually a silicon with a pore structure in consideration of both volume expansion and the capacity improvement.

Technical Solution

An embodiment of the present specification provides a negative electrode active material which includes a silicon-based composite represented by $SiO_a$ (0≤a<1), and a carbon coating layer distributed on a surface of the silicon-based composite, wherein the silicon-based composite has a bimodal pore structure including mesopores and macropores.

According to another embodiment of the present specification, the silicon-based composite may have the bimodal pore structure formed entirely from an inner central portion to a surface portion of the silicon-based composite.

According to still another embodiment of the present specification, a diameter of the mesopore may be in a range of 2 to 50 nm, and a diameter of the macropore may be in a range of 50 to 700 nm.

According to yet another embodiment of the present specification, a crystal size of a crystalline portion of the silicon may be in a range of 1 to 50 nm.

According to yet another embodiment of the present specification, a thickness of the carbon coating layer may be in a range of 0.003 to 3.0 μm.

According to yet another embodiment of the present specification, a specific surface area of the negative electrode active material may be in a range of 1 to 20 $m^2/g$.

According to yet another embodiment of the present specification, a porosity of the negative electrode active material may be in a range of 10 to 50%.

According to yet another embodiment of the present specification, an average particle diameter of the negative electrode active material may be in a range of 0.1 to 20 μm, and an average particle diameter of the negative electrode active material may be in a range of 0.5 to 10 μm.

In order to accomplish the object, yet another embodiment of the present specification provides a method of preparing a negative electrode active material, which includes: forming a carbon coating layer on a silicon-based precursor represented by $SiO_x$ (0<x≤2); thermally treating the silicon-based precursor on which the carbon coating layer is formed; and preparing a silicon-based composite represented by $SiO_a$ (0≤a<1) and having a surface on which a carbon coating layer is distributed by removing impurities, wherein the silicon-based composite has a bimodal pore structure including mesopores and macropores.

According to yet another embodiment of the present specification, the carbon coating layer may include one or more selected from the group consisting of natural graphite, artificial graphite, mesocarbon microbeads (MCMB), carbon fibers and carbon black.

According to yet another embodiment of the present specification, a content of the carbon coating layer may be in a range of 1 to 50 wt % of a total weight of the negative electrode active material.

According to yet another embodiment of the present specification, the thermal treatment may include thermally reducing a silicon-based precursor with a metal reducing agent in an inert atmosphere.

According to yet another embodiment of the present specification, the thermal treatment may be performed in a temperature range of 650 to 900° C.

According to yet another embodiment of the present specification, the thermal treatment may be performed in a rotary kiln.

According to yet another embodiment of the present specification, the metal reducing agent may include one selected from the group consisting of Ti, Al, Mg, Ca, Be, Sr, Ba and a combination thereof.

According to yet another embodiment of the present specification, a molar ratio of the silicon-based precursor to the metal reducing agent may be in a range of 1:0.001 to 1:1.

According to yet another embodiment of the present specification, the preparing the silicon-based composite may include removing impurities using an acidic aqueous solution According to yet another embodiment of the present specification, the acidic aqueous solution may include one or more selected from the group consisting of hydrochloric acid, nitric acid and sulfuric acid.

According to yet another embodiment of the present specification, the impurities may include one or more materials selected from the group consisting of a metal oxide, a metal silicide and a metal silicate, and the metal is one selected from the group consisting of Ti, Al, Mg, Ca, Be, Sr, Ba and a combination thereof.

In order to accomplish the object, yet another embodiment of the present specification provides a negative electrode for a lithium secondary battery including the above-described negative electrode active material.

In order to accomplish the object, yet another of the present specification provides a lithium secondary battery including the above-described negative electrode.

Advantageous Effects

A negative electrode active material according to the present specification includes silicon (Si) and a silicon-based composite having a low oxygen content, and thus, when the negative electrode active material is applied to a lithium secondary battery, initial capacity and efficiency can be improved.

Further, according to the negative electrode active material of the present specification, since a silicon-based precursor is reduced after the carbon coating layer is formed, the crystal growth of silicon can be easily controlled, reduction can be uniformly performed inside thereof, a pore structure is well developed throughout the particle, and thus a lithium secondary battery with lifetime characteristics improved due to enhancement of swelling characteristics can be provided.

Further, according to the negative electrode active material of the present specification, since the specific surface area of the negative electrode active material is reduced due to the carbon coating layer, the side reaction with an electrolyte can be reduced.

BEST MODE FOR CARRYING OUT THE INVENTION

Examples

Figure 1:
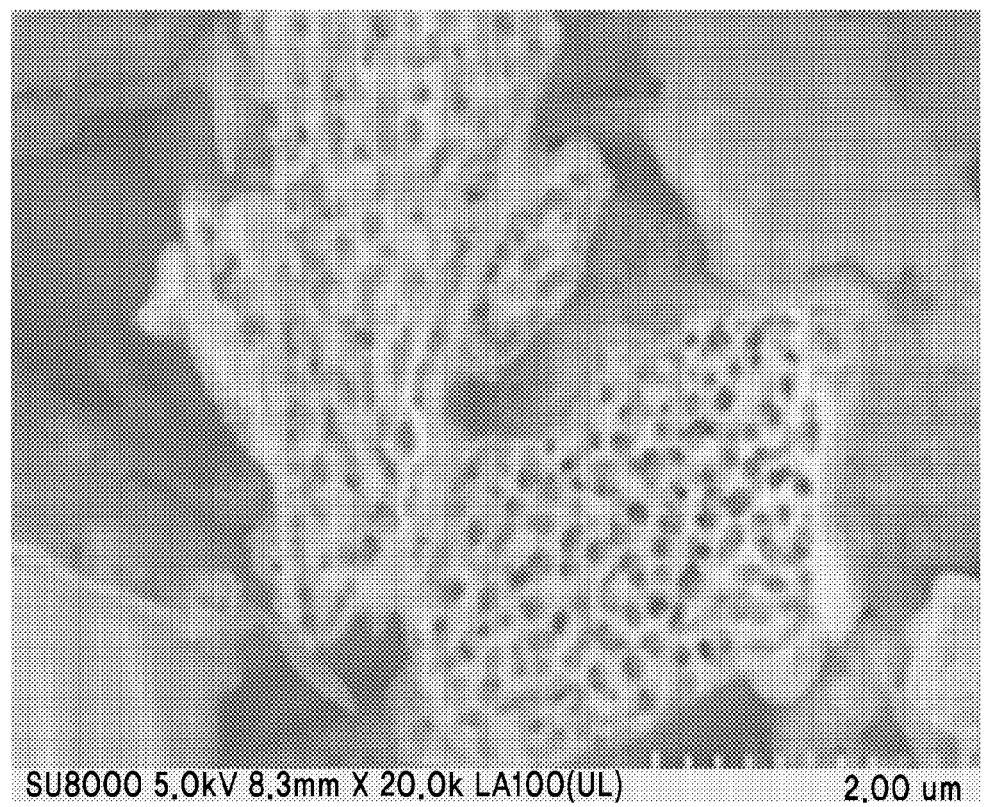
FIG. 1 is a scanning electron microscope (SEM) image of a cross-section (inside) of a silicon-based composite of Example 1 according to the present specification.

Hereinafter, the present specification will be described in more detail. However, the following examples are merely provided to allow for a clearer understanding of the present specification, rather than to limit the scope thereof.

Example 1

1. Preparation of SiO Having Carbon Coating Layer Formed Thereon 100 g of SiO was introduced into a rotary kiln, argon gas was flowed thereinto at a rate of 0.5 L/min and a temperature was raised up to 1000° C. at a rate of 5° C./min. Thermal treatment was performed for 5 hours while rotating the rotary kiln at a rate of 30 rpm/min, flowing argon gas at a rate of 1.8 L/min and flowing acetylene gas at a rate of 0.5 L/min, and thereby SiO having a carbon coating layer formed thereon was prepared. Here, a carbon content of the carbon coating layer was 10 wt % based on SiO.

2. Preparation of Silicon-Based Composite 100 g of the prepared $SiO_x$ (x=1) having a carbon coating layer formed thereon and 41 g of Mg powder as a metal reducing agent were mixed, and then put in a reaction vessel of a thermal reduction chamber. Subsequently, the temperature of the chamber was increased to 750° C. Thereafter, Ar was used as an inert gas, and Ar was supplied at a flow rate of about 800 sccm.

Further, the reaction was performed using a rotary kiln as the reaction vessel.

The thermal reduction reaction was performed for 12 hours, and the chamber temperature was decreased to room temperature after 12 hours. A product in the reaction vessel was collected to prepare a silicon-based composite.

Reduced MgO or the like was removed from the prepared silicon-based composite using HCl (1N).

3. Preparation of Negative Electrode

The silicon-based composite with a carbon coating layer formed thereon prepared in the above 2 as a negative electrode active material, acetylene black as a conductive agent, and polyvinylidene fluoride as a binder were mixed at a weight ratio of 95:1:4 and the mixture was mixed with N-methyl-2-pyrrolidone as a solvent to prepare a slurry. One surface of a copper current collector was coated with the prepared slurry to have a thickness of 30 μm, dried, rolled and punched into a predetermined size to prepare a negative electrode.

4. Preparation of Lithium Secondary Battery

A coin-type half cell (2016 R-type half cell) was prepared using the negative electrode, a lithium counter electrode, a microporous polyethylene separator and an electrolyte in a helium-filled glove box. A solution prepared by dissolving 1

M LiPF$_6$ in a solvent in which ethylene carbonate and dimethyl carbonate were mixed in a volume ratio of 50:50 was used as the electrolyte.

Comparative Example 1

1. Preparation of Silicon-Based Composite

A silicon-based composite including silicon with a porous structure was prepared using an etching process.

2. Preparation of Secondary Battery

A lithium secondary battery was prepared in the same manner as in Example 1 except that the silicon-based composite prepared in the above 1 was used as a negative electrode active material.

Comparative Example 2

1. Preparation of Silicon-Based Composite

A silicon-based composite was prepared in the same manner as in Example 1 except that no carbon coating layer was formed.

2. Preparation of Secondary Battery

A lithium secondary battery was prepared in the same manner as in Example 1 except that the silicon-based composite prepared in the above 1 was used as a negative electrode active material.

Experimental Example 1

Observation of Morphology

In order to determine the morphology of the surface and inside of the silicon-based composites prepared in Example 1 and Comparative Examples 1 and 2, the silicon-based composites were observed using a scanning electron microscope, and the results are shown in FIGS. 1 to 6.

Figure 2:
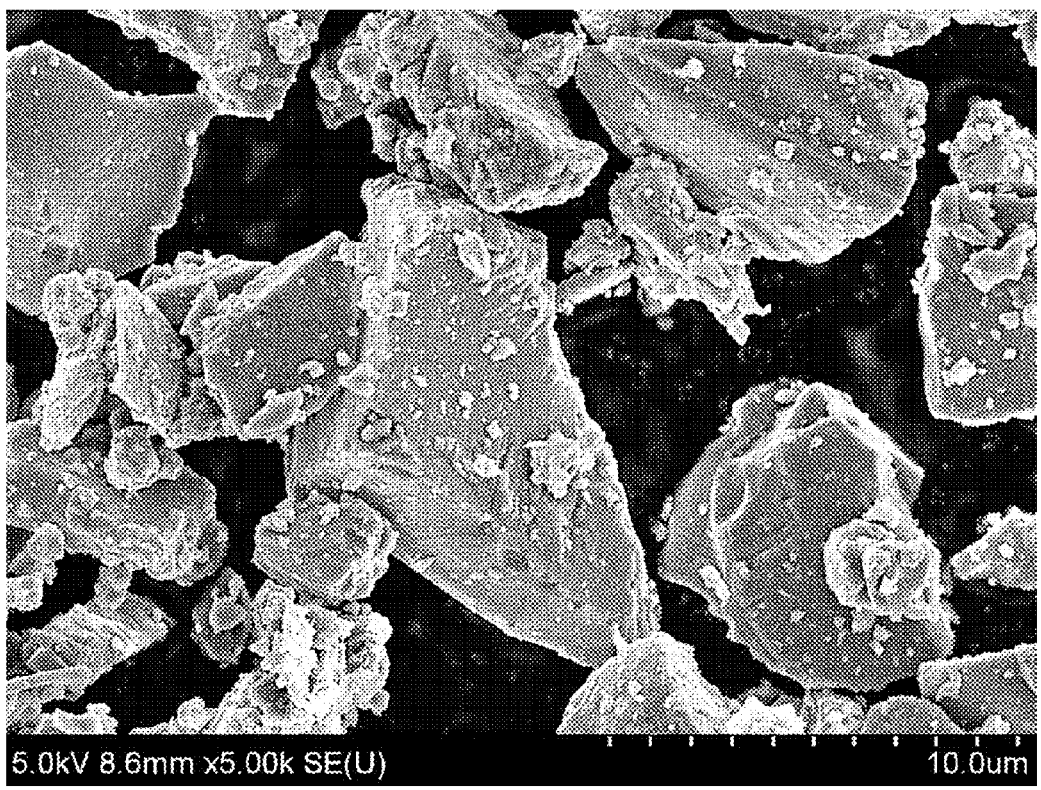
FIG. 2 is an SEM image of a surface of the silicon-based composite of Example 1 according to the present specification.
Figure 4:
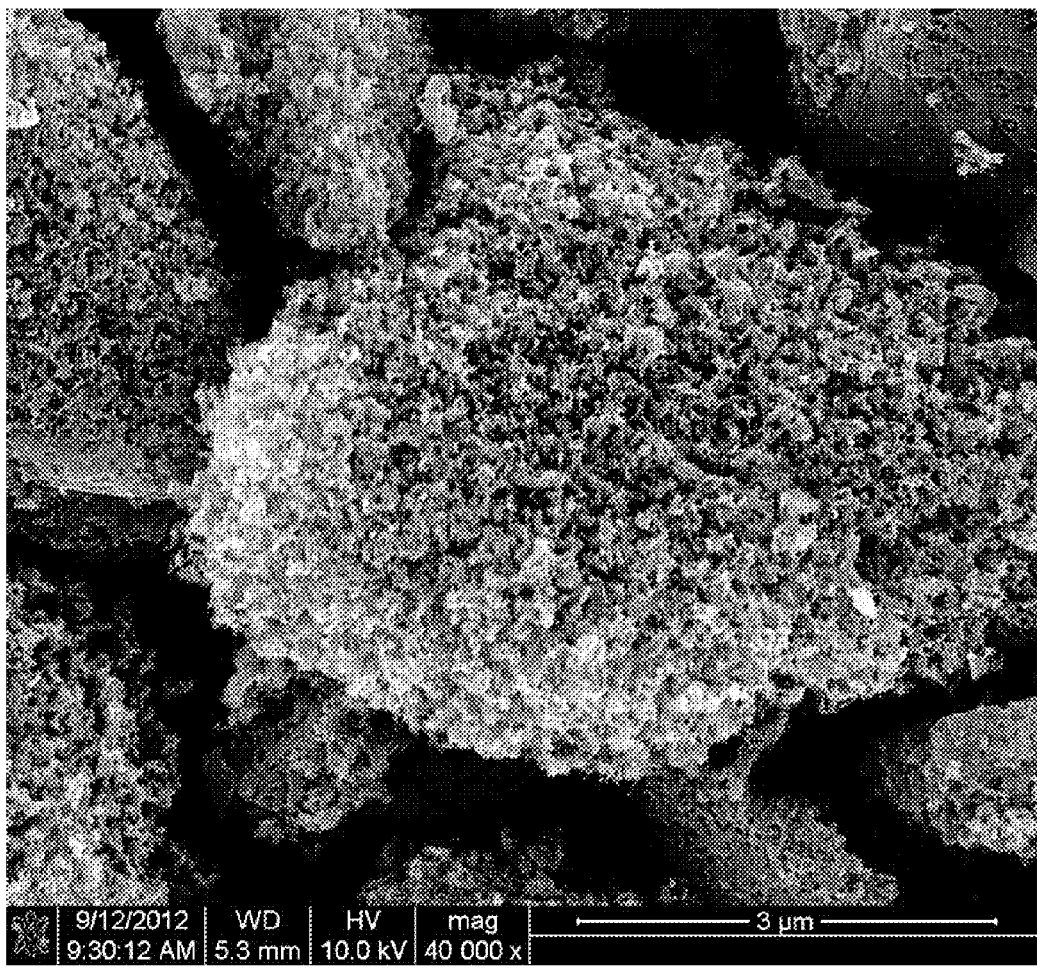
FIG. 4 is an SEM image of a surface of the silicon-based composite of Comparative Example 1.
Figure 6:
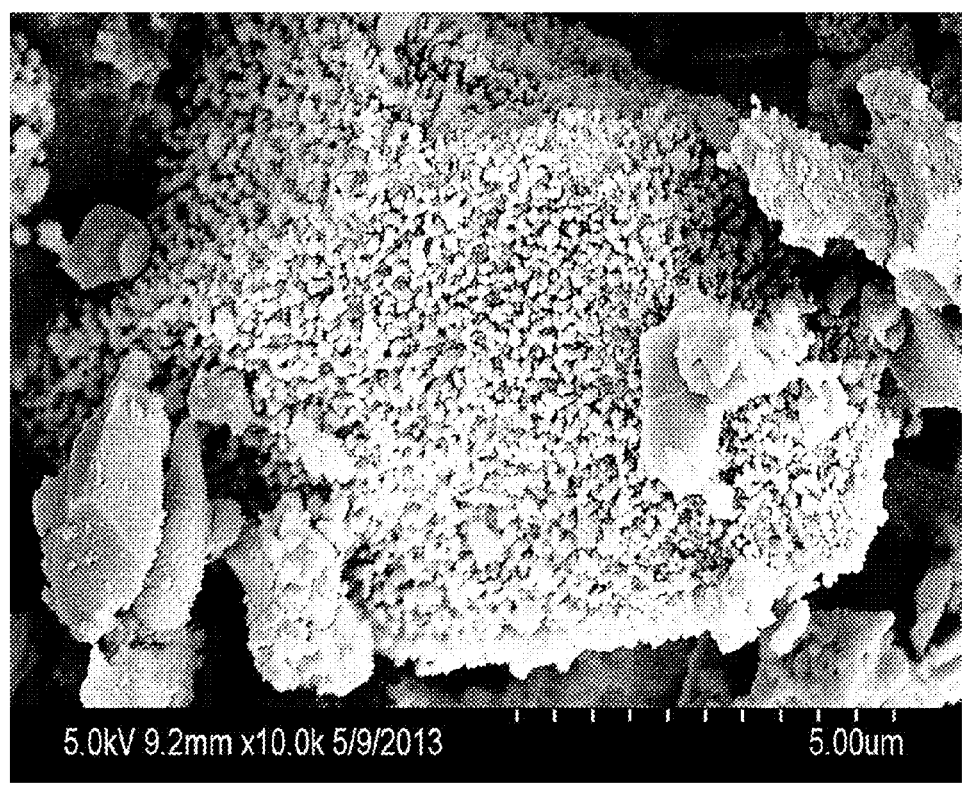
FIG. 6 is an SEM image of a surface of the silicon-based composite of Comparative Example 2.

Referring to FIGS. 2, 4 and 6 showing the surface of the silicon-based composites of Example 1 and Comparative Examples 1 and 2, it can be seen that there is a large difference in the shape of the outer surface. In the case of FIG. 2 showing the surface of Example 1, almost no pore is observed on the surface due to the carbon coating layer. However, in the case of FIGS. 4 and 6 showing the surfaces of Comparative Examples 1 and 2, it is determined that there are quite a few pores on the outermost surface.

Accordingly, it can be seen with the naked eye that the case of Comparative Example 1 which is porous silicon of which the specific surface area of the outermost surface as a portion in contact with an electrolyte was formed by an etching process and the case of Comparative Example 2 in which the carbon coating layer was not formed have significantly higher values than those of Example 1 which is a porous silicon-based composite prepared by the method according to the present specification, and thus it can be confirmed that the side reaction with the electrolyte can be reduced in the case of Example 1.

Figure 3:
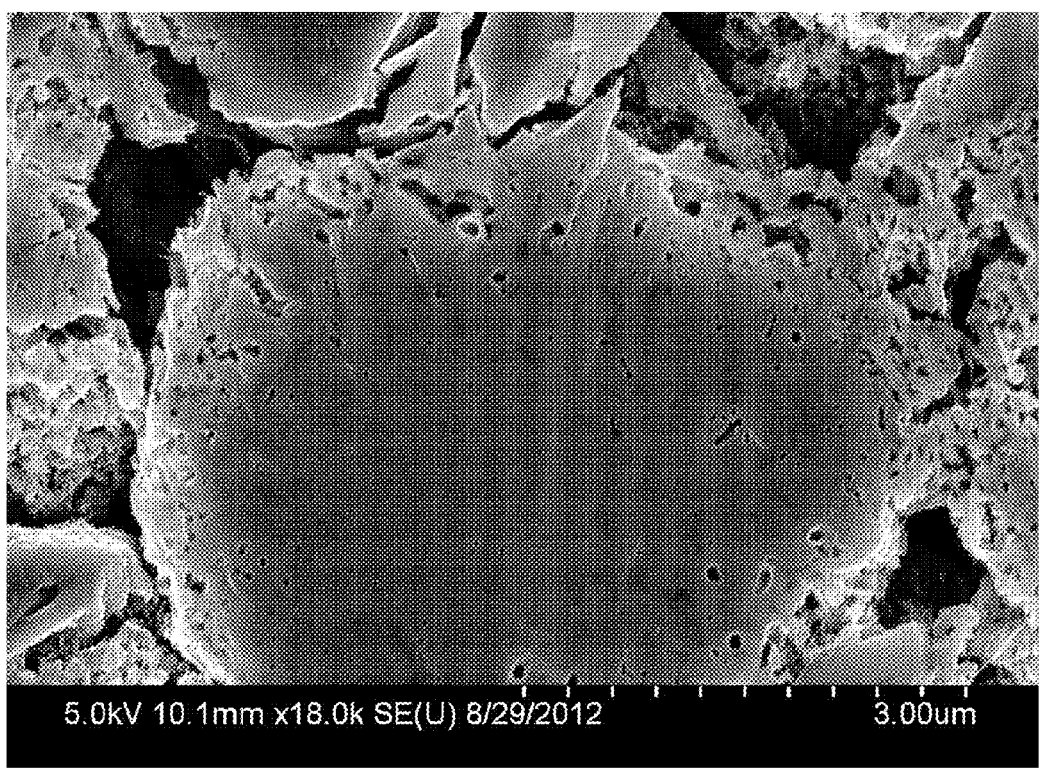
FIG. 3 is an SEM image of a cross-section (inside) of the silicon-based composite of Comparative Example 1.
Figure 5:
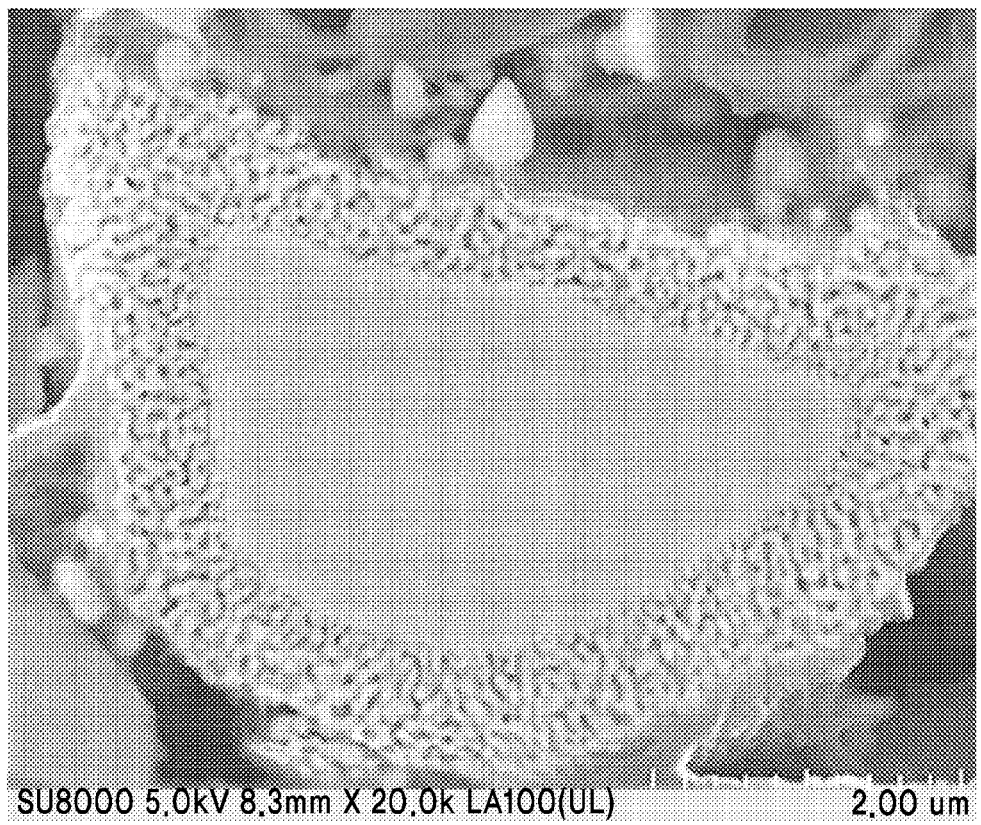
FIG. 5 is an SEM image of a cross-section (inside) of the silicon-based composite of Comparative Example 2.

Further, referring to FIGS. 1, 3 and 5 in which the internal structure is observed, it can be confirmed that pores are hardly distributed in the interior of Comparative Example 1 of FIG. 3, and in the case of Comparative Example 2 of FIG. 5, the pore distribution of the inner side is not uniform as compared with the surface portion. On the other hand, in the case of Example 1 of FIG. 1, it was confirmed that the portion close to the central portion or the surface or the whole portion had a uniform pore structure.

Accordingly, it was found that the swelling phenomenon can be greatly reduced due to the uniform pore structure formed inside, the lifetime characteristics of the battery can be improved due to the reduction in volume expansion, and initial capacity and efficiency can also be increased.

Experimental Example 2: Performance Evaluation of Secondary Battery

1. Measurement of Initial Discharge Capacity, Initial Efficiency and Lifetime Characteristics In order to determine initial discharge capacities of the coin-type half cells prepared in Example 1 and Comparative Examples 1 and 2, the coin-type half cells were charged and discharged to 0.1 C at a voltage of 0 V to 1.5 V once, and initial discharge capacities, initial charge capacities and Coulombic efficiency were measured.

The measurement results of the initial discharge capacity, initial efficiency and lifetime characteristics measured by the above-described method are shown in the following Table 1.

2. Measurement of Lifetime Characteristics and Change in Thickness (Swelling)

After the initial charging and discharging were performed on the coin-type half cells prepared in Example 1 and Comparative Examples 1 and 2, charging and discharging were carried out 49 times at a 0.5 C-rate in the same voltage range, the difference of the initial thickness and the final thickness after the last charging and discharging were measured and a thickness increase rate is shown in the following Table 1.

TABLE 1

| | Initial discharge capacity (mAh/g) | Initial efficiency (%) | Lifetime characteristics (%) | Swelling (%) |
|---|---|---|---|---|
| Example 1 | 3100 | 90 | 60 | 190 |
| Comparative Example 1 | 3050 | 88 | 30 | 280 |
| Comparative Example 2 | 3120 | 84 | 35 | 260 |

Initial efficiency (%): (Discharge capacity of first cycle/Charge capacity of first cycle)×100

Lifetime characteristics: (Discharge capacity of 49$_{th}$ cycle/Discharge capacity of first cycle)×100

Swelling (%): {(Final thickness−initial thickness)/Initial thickness}×100

As shown in Table 1, as a result of measuring and comparing the initial discharge capacity and swelling of Examples 1 and Comparative Examples 1 and 2, the initial efficiency of the secondary batteries of Examples 1 including the silicon-based composite having the carbon coating layer formed thereon increased by about 2 to 6% and the lifetime characteristics thereof was improved by about 25 to 30% as compared to the secondary battery of Comparative Example 1 including the silicon-based composite formed by an etching process and the secondary battery of Comparative Example 2 including the silicon-based composite on which the carbon coating layer was not formed. On the other hand, the swelling phenomenon was reduced by 70 to 90%, from which it can be determined that the safety of the battery is improved.

It can be seen that the efficiency of the battery is improved by being imparted with the conductivity of the silicon-based composite, which is imparted by the carbon coating layer as in Example 1. Further, in Example 1, it was confirmed from the fact that lifetime characteristics increased and swelling phenomenon decreased that the reduction rate can be controlled by reducing SiO after the formation of the carbon coating layer, and thus the inside of SiO can be uniformly reduced, and crystalline Si and crystalline $SiO_2$ can be easily controlled.

While the present specification has been particularly shown and described with reference to preferred embodiments thereof, it will be understood by those skilled in the art that various modifications and variations may be made therein without departing from the spirit and scope of the invention as defined by the appended claims. Thus, the invention is intended to cover all modifications, equivalents, and alternatives falling within the scope of the invention as defined by the appended claims.

Modes of the Invention

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation. Therefore, the embodiments described in the specification and elements illustrated in the drawings are just a preferable example for the purpose of illustration only, not intended to limit the scope of the disclosure, so it should be understood that other equivalents and modifications could be made thereto at the time of filing the application.

An embodiment of the present specification provides a negative electrode active material which includes a silicon-based composite represented by $SiO_a$ ($0 \leq a < 1$), and a carbon coating layer distributed on a surface of the silicon-based composite, wherein the silicon-based composite has a bimodal pore structure including mesopores and macropores.

Generally, in the silicon-based material, cracking of particles, chemical pulverization or the like easily occurs due to large changes in volume (swelling) during charge and discharge, and thus there is a problem in that lifetime characteristics rapidly decrease.

In order to address the above-described issue, an attempt to suppress the volume expansion by preparing porous silicon using an etching process at a surface portion has been made, but it was impossible to completely suppress the volume expansion using this method. Also, when the specific surface area becomes too large due to excessive etching, a side reaction with the electrolyte easily occurs.

However, the negative electrode active material according to the present specification includes a silicon-based composite represented by $SiO_a$ ($0 \leq a < 1$), and the silicon-based composite has a bimodal pore structure including mesopores and macropores. Therefore, in the lithium secondary battery to which the negative electrode active material according to the present specification is applied, a volume expansion problem can be prevented to improve lifetime characteristics, initial efficiency and capacity characteristics can be enhanced by controlling an oxygen content of the product, and the specific surface area can be controlled as compared with other pore structures due to the carbon coating layer, such that the side reaction with the electrolyte can be reduced.

Further, although the total specific surface area may not be significantly different from that of the negative electrode active material prepared using a conventional method, the pores of the bimodal structure are uniformly distributed throughout from the inner central portion to the surface portion of the composite, thereby contributing to the performance improvement of the secondary battery as described above.

The negative electrode active material according to the present specification includes a silicon-based composite and a carbon coating layer, the silicon-based composite is represented by $SiO_a$ ($0 \leq a < 1$), the carbon coating layer may be in the form of a layer formed to surround the surface of the silicon-based composite, and the silicon-based composite has a bimodal pore structure including mesopores and macropores.

When the silicon-based composite is used as a negative electrode active material, the silicon included in the silicon-based composite may substantially cause an electrochemical reaction when lithium ions deintercalated from a positive electrode active material are absorbed, stored and released. The crystalline characteristic of the silicon may partially be amorphous, but mostly crystalline. This is because, when silica is reduced by thermal reduction using a metallic gas to be described below, the reduction is performed under the carbon coating layer at a relatively high temperature, and thus most of the silica may be reduced to crystalline silicon.

A crystal size of crystalline silicon which is present in the silicon-based composite may be 1 to 50 nm, and preferably 1 to 20 nm. Here, the crystal size may be determined by X-ray diffraction (XRD) analysis or electron microscopy (SEM and TEM). Although to be described below, the reason why the crystalline size of the crystalline silicon may be in the above-described range is that the thermal reduction can be performed even at a low temperature, and uniform reduction of the silicon-based composite as a whole can be achieved by forming the carbon coating layer even when a metal reducing agent having a strong reducing property is used, and a content of oxygen and a porous structure can be properly controlled.

The silicon-based composite may be represented by $SiO_a$ ($0 \leq a < 1$). In the silicon-based composite, the ratio of crystalline silicon and crystalline silica contained therein may be expressed as $1-(a/2):(a/2)$. In this case, the entire composition of the silicon-based composite may be represented by $SiO_a$ ($0 \leq a < 1$).

Specifically, when a is 1 or more, the proportion of silica is higher than that of silicon (the content of oxygen is higher) as compared to the case in which a is less than 1, and the swelling phenomenon of the negative electrode active material may be lowered to a certain extent, but the initial discharge capacity of the lithium secondary battery may be reduced.

However, the silicon-based composite according to the present specification ultimately aims for the case where a is 0, and in this case, swelling properties can be greatly improved to increase lifetime characteristics. However, the present specification is not limited to the silicon-based composite including only crystalline silicon. Since a silicon-based precursor remaining unreduced, or a silicon-based precursor produced by reoxidation may be present during the reduction reaction, a may have a range of 0 or more to less than 1.

The silicon-based composite may have a bimodal pore structure including mesopores and macropores. Although to be described below, the bimodal pore structure is a space originally occupied by a metal oxide with a large crystal size which is generated when silica is reduced by a metal reducing agent and a metallic material is oxidized, and may be formed by the removal of the metal oxide. Since thermal reduction is performed after forming the carbon coating layer, the reaction rate can be easily controlled due to the carbon coating layer, and thus, the above-described pore structure can be uniformly formed all the way inside of the silicon-based composite and have a pore structure including mesopores and macropores as a bimodal pore structure.

A diameter of the mesopore of the bimodal pore structure may be in the range of 2 to 50 nm, and a diameter of the macropore may be in the range of 50 to 700 nm. When the silicon-based composite has such a bimodal pore structure and nanopores and mesopores have a size within the above range, the porosity can be controlled by adjusting the amount of silicon to be reduced (i.e., the amount of the metal to be oxidized), and thereby the volume expansion thereof can be reduced, and the lifetime characteristics can be improved. Further, a porosity of the silicon-based composite having the bimodal pore structure may be in the range of 10 to 50%, which may be a range that can be controlled by the metal reducing agent.

The negative electrode active material according to the present specification may include a carbon coating layer distributed on a surface of the silicon-based composite. When the above-described carbon coating layer is formed, the reaction rate can be controlled and the reducing agent can be prevented from reacting only on the surface of the crystalline silica during the reduction of the crystalline silica. Accordingly, the inside of the crystalline silica can be uniformly reduced, and the oxygen content and the specific surface area can be easily controlled.

When the carbon coating layer is formed on the surface of the silicon-based composite, electrical conductivity is imparted to the silicon-based composite, thereby improving the initial efficiency, lifetime characteristics, and battery capacity characteristics of the secondary battery including the silicon-based composite.

The thickness of the carbon coating layer may be in the range of 0.003 μm to 3.0 μm. When the thickness of the carbon coating layer is less than 0.003 μm, a carbon coating layer is too thin to contribute greatly to improvement of electrical conductivity. When the size of the carbon coating layer is more than 3.0 μm, the size of the negative electrode active material may become excessively large due to an excessively thick carbon coating layer, the absorption, storing and release of lithium ions may be inhibited, and capacity and initial efficiency may be rather reduced.

The negative electrode active material including a silicon-based composite having a carbon coating layer formed thereon according to an embodiment of the present specification may have a specific surface area in the range of 1 to 20 m²/g, which represents an area of a portion that may come into contact with an electrolyte, and may be less related to porosity due to a bimodal pore structure in the silicon-based composite. When the negative electrode active material has a specific surface area within the above range, the side reaction with the electrolyte can be greatly reduced.

Further, an average particle diameter of the negative electrode active material may be in the range of 0.1 to 20 μm, and preferably in the range of 0.5 to 10 μm. When the particle diameter of the negative electrode active material is less than 0.1 μm, an electrode density may be reduced. When the particle diameter of the negative electrode active material is more than 20 μm, rate-determining characteristics may be lowered, or lifetime characteristics may be reduced due to volume expansion.

Further, silicon particles used as a negative electrode active material generally involve a very complicated crystal change in the reaction of electrochemical absorption, storing and release of lithium atoms. As the reaction of electrochemical absorption, storing and release of lithium atoms proceeds, the composition and crystal structure of silicon particles are changed to Si (crystal structure: Fd3m), LiSi (crystal structure: I41/a), $Li_2Si$ (crystal structure: C2/m), $Li_7Si_2$ (Pbam), $Li_{22}Si_5$ (F23), etc. Further, the volume of the silicon particles expands by about four times as the complex crystal structure changes, and the reaction between the silicon-based composite according to an embodiment of the present specification and lithium atoms has an advantage in that the reaction can proceed while maintaining the crystal structure of the silicon-based composite.

Another embodiment of the present specification provides a method of preparing the above-described negative electrode active material.

The method of preparing a negative electrode active material includes forming a carbon coating layer on a silicon-based precursor represented by $SiO_x$ (0<x≤2); thermally treating the silicon-based precursor on which the carbon coating layer is formed; and preparing a silicon-based composite represented by $SiO_a$ (0≤a<1) having a surface on which a carbon coating layer is distributed by removing impurities.

According to an embodiment of the present specification, the formation of a carbon coating layer on a silicon-based precursor may be the formation of a coating layer by covering a surface of the silicon-based precursor with a carbon-based material before the silicon-based precursor which is a raw material is reduced.

The silicon-based precursor represented by $SiO_x$ (0<x≤2), which is a raw material, may include a crystalline silica, a material in which crystalline silicon and crystalline silica form a composite and a mixture including amorphous material. Also a material in which the two materials among these are mixed may be applied as a raw material.

Further, a carbon coating layer formed on a surface of the silicon-based precursor as a coating layer may include, for example, graphite such as natural graphite and artificial graphite, carbon fibers such as mesocarbon microbeads (MCMB), carbon nanotubes and carbon nanofibers, carbon black such as Ketjen black, Denka black and acetylene black, or a mixture thereof, and any carbon source enabling carbon coating on the surface of the silicon-based precursor may be applied without particular limitation.

The formation of the carbon coating layer as described above may be performed by dispersing the carbon precursor in a solvent such as tetrahydrofuran (THF), an alcohol or the like, and adding a mixture thus obtained to the silicon-based precursor, followed by drying and thermal treatment, and may be performed by supplying acetylene gas, but any carbon-coating method typically used in the related field may be used without particular limitation.

The content of the carbon coating layer may be in the range of 1 to 50 wt % of the total weight of the negative electrode active material. When the carbon coating layer is coated in an amount of less than 1 wt %, a uniform coating layer may not be formed and conductivity may be deteriorated. When the carbon coating layer is applied in an amount of more than 50 wt %, a coating layer becomes too thick, the size of the negative electrode active material may become too large, and the capacity and initial efficiency may be rather reduced. When the coating amount is appropriately controlled, as described above, the silicon-based composite is suitably imparted with electrical conductivity, and thereby the initial efficiency, lifetime characteristics, and battery capacity characteristics of the secondary battery including the silicon-based composite can be improved.

In the method of preparing a negative electrode active material according to an embodiment of the present specification, the reaction rate may be controlled because the silicon-based precursor is reduced after the carbon coating layer is formed, and a reducing agent may be prevented from reacting only on a surface of the silicon-based precursor. Accordingly, the inside of the silicon-based precursor can be uniformly reduced, and thus porous silicon-based composites, ideally porous silicon, can be prepared, the oxygen content in the produced silicon-based composite can be easily controlled, and the carbon coating layer can also serve to reduce the specific surface area of the entire negative electrode active material by preventing the crystal growth of silicon to a certain extent and maintaining the silicon after the reaction as a barrier layer, and basically serve to impart conductivity to the silicon-based active material.

According to an embodiment of the present specification, the step of thermal treatment may be a step of reducing the silicon-based precursor having a surface coated with the carbon coating layer by heating under specific conditions, and specifically, the step of thermal treatment may include a step of thermally reducing the silicon-based precursor using a metal reducing agent under an inert atmosphere.

The thermal reduction of the silicon-based precursor may be performed by a process of thermally reducing the silicon-based precursor using a metallic powder or a metallic gas containing a metal reducing agent in an inert atmosphere. Oxygen is locally released in the form of a metal oxide by the metal in the silicon-based precursor by the thermal reduction, and thereby local reduction occurs.

That is, the content of oxygen decreases or only a very small amount remains as the silicon-based precursor is reduced, and as a result, a silicon-based composite including only crystalline silicon can be ideally produced, or a silicon-based composite in which crystalline silicon, (crystalline or amorphous) silica remaining unreduced, and (crystalline or amorphous) silica produced by reoxidation are present to form a composite can be generally produced. As described above, the silicon prepared may be crystalline silicon, amorphous silicon, or a mixture thereof.

For example, Ti, Al, Mg, Ca, Be, Sr, Ba or a combination thereof may be applied as the metal reducing agent, and thermal reduction may be performed using powders or gases of the above-described metals. Any type of a metal reducing agent may be used without limitation as long as it has sufficient reducing power to separate or extract oxygen from the above-described silicon-based precursor described above, and preferably, magnesium (Mg) may be used.

Further, the thermal treatment may be performed at a temperature of 500° C. or higher, and preferably in a temperature range of 650 to 900° C. When the temperature of the thermal treatment is less than 500° C., it may be difficult for the reduction reaction to occur due to a low temperature and a silicon-based composite with a high oxygen content may be formed. When the temperature of the thermal treatment is more than 900° C. or 1000° C., the crystal of silicon may grow large, and the crystal characteristic may be degraded.

As described above, when the thermal reduction is carried out by performing the thermal treatment at a temperature of 500° C. or more, strong reduction by a metal reducing agent may be achieved, the amount of oxygen in the silicon-based composite prepared by the reduction which proceeds with diffusion can be easily controlled, and a silicon-based composite having a bimodal pore structure, that is, $SiO_a$ (0≤a<1) can be prepared.

Further, a may be 0 in $SiO_a$ which is the silicon-based composite, and this is the most optimal form that the silicon-based composite can have as described above, and may represent a silicon-based composite in which only porous silicon having a bimodal pore structure remains.

In this case, the initial efficiency and capacity characteristics may be remarkably excellent. When the oxygen content is low, although problems due to volume expansion may occur, the silicon-based composite is porous, and thus the problems due to volume expansion may also be prevented, and thereby a negative electrode active material having excellent properties can be provided.

However, even when no reduction reaction occurs, or oxygen is still present in the composite due to reoxidation and a is not 0 but has a value in the range of 0 to 1, the lifetime characteristics can be greatly improved as compared with the case where the porous silicon is conventionally formed through the etching process, and the specific surface area which is a contact area with the electrolyte is reduced due to the formation of the carbon coating layer to greatly contribute to improving the lifetime characteristics and conductivity.

Further, the thermal reduction may be performed while flowing an inert gas, and examples of the inert gas which may be used herein include, for example, Ar, $N_2$, Ne, He, Kr, or a mixed gas thereof.

The step of thermal treatment may include performing a reaction of a mixture obtained by mixing a metallic powder or a metallic gas containing a metal reducing agent such as magnesium with the silicon-based precursor in a reaction furnace. For example, the reaction may be performed in a rotary kiln to maintain a uniform reaction by maximizing a contact area between the silicon-based precursor and Mg which is a metal reducing agent.

In the method of preparing a negative electrode active material according to the present specification, the amount of oxygen in the finally prepared silicon-based composite may be controlled by adjusting the ratio of the silicon-based precursor and the metal reducing agent in the step of thermal treatment. In order to control the amount of oxygen in the silicon-based composite, a molar ratio of the silicon-based precursor to a metal reducing agent may be in the range of 1:0.001 to 1:1.

As the amount of the metal reducing agent becomes larger, a larger amount of the silicon-based precursor may be reduced, and thus the amount of oxygen contained in the prepared silicon-based composite can be easily controlled by controlling the amount of the metal reducing agent used in the thermal reduction, and the ratio of silicon in the silicon-based composite may be further increased.

As an example, Mg may be included as the metal reducing agent.

Accordingly, a stoichiometric reaction of the silicon-based precursor and Mg as the reducing agent is as follows:

$$2Mg + SiO_2 \rightarrow Si + 2MgO \qquad \text{Reaction Formula 1}$$

That is, as shown in Reaction Formula 1, the metal, as a reducing agent, reduces silica, whereby the metal may be oxidized to produce a metal oxide, and the silica may be reduced to produce silicon. In addition, a metallic reducing agent other than Mg may be used as the reducing agent, and in this case, the reduction of the silicon-based precursor occurs by a reaction similar to the above reaction formula.

According to an embodiment of the present specification, the preparing of the silicon-based composite may include removing impurities using an acidic aqueous solution.

As the acidic aqueous solution, for example, hydrochloric acid, nitric acid, sulfuric acid and the like may be used, and preferably, an aqueous hydrochloric acid solution may be used and may be used at a concentration in the range of about 0.1 to 10 N. When hydrochloric acid is used at a concentration of less than 0.1 N, impurities may not be completely removed. When hydrochloric acid is used at a concentration of more than 10 N, preparation efficiency may be lowered. Examples of the removed impurities include MgO, $Mg_2Si$, $Mg_2SiO_4$, etc., and the impurities may vary depending on the type of metal used as a metal reducing agent.

After impurities including metal oxides are removed from the silicon-based composite, a silicon-based composite including amorphous silicon, crystalline silicon and crystalline silica may be obtained after undergoing general cleaning and drying processes.

As described above, the silicon-based composite prepared by reducing SiO may include crystalline silicon, amorphous silicon and crystalline silica. The negative electrode active material including the silicon-based composite can allow the reaction between the amorphous silica and lithium contained in the electrolyte to be excluded, and improve the initial efficiency and capacity characteristics of the secondary battery.

Still another embodiment of the present specification provides a lithium secondary battery including the negative electrode active material prepared by the method of preparing the negative electrode active material.

The lithium secondary battery includes a positive electrode including a positive electrode active material; a separator; a negative electrode including the negative electrode active material; and an electrolyte, and the negative electrode may be prepared with the negative electrode active material. For example, the negative electrode active material according to an embodiment of the present specification is mixed with a binder, a solvent, and a conductive agent and a dispersant as necessary, and stirred to prepare a slurry. Then, a current collector may be coated with the slurry and pressed to prepare the negative electrode.

Examples of the binder include a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, styrene-butadiene rubber (SBR), fluoro rubber, various copolymers, etc.

Examples of the solvent include N-methyl-2-pyrrolidone, acetone, water and the like.

The conductive agent is not particularly limited as long as it has conductivity and does not generate chemical changes in the battery. Examples thereof include graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; a conductive metal oxide such as titanium oxide; a conductive material such as a polyphenylene derivative, etc.

An aqueous-based dispersant or an organic dispersant such as N-methyl-2-pyrrolidone may be used as the dispersant.

As in the preparation of the negative electrode, a positive electrode active material, a conductive agent, a binder, and a solvent are mixed to prepare a slurry, and then a positive electrode may be prepared by directly coating a metal current collector with the slurry or by casting the slurry on a separate support and laminating a positive electrode active material film separated from the support on a metal current collector.

Examples of the positive electrode active material may be a layered compound, such as lithium cobalt oxide ($LiCoO_2$) or lithium nickel oxide ($LiNiO_2$), or a compound substituted with at least one transition metal; lithium manganese oxides represented by the chemical formula $Li_{i+y}Mn_{2-y}O_4$ (where y is in the range of 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide represented by the chemical formula of $LiNi_{1-y}M_yO_2$ (where M is cobalt (Co), manganese (Mn), aluminum (Al), copper (Cu), iron (Fe), magnesium (Mg), boron (B), or gallium (Ga), and y is in the range of 0.01 to 0.3); a lithium manganese composite oxide represented by the chemical formula of $LiMn_{2-y}M_yO_2$ (where M is cobalt (Co), nickel (Ni), iron (Fe), chromium (Cr), zinc (Zn), or tantalum (Ta), and y is in the range of 0.01 to 0.1) or $Li_2Mn_3MO_8$ (where M is Fe, Co, Ni, Cu, or Zn); and $LiMn_2O_4$ having a part of lithium (Li) being substituted with alkaline earth metal ions, but the present specification is not limited thereto.

As the separator, a typical porous polymer film used as a conventional separator, for example, a porous polymer film prepared using a polyolefin-based polymer, such as an ethylene homopolymer, a propylene homopolymer, an ethylene/butene copolymer, an ethylene/hexene copolymer, and an ethylene/methacrylate copolymer, may be used alone or by being laminated. A typical porous nonwoven fabric, for example, a nonwoven fabric formed of high melting point glass fibers or polyethylene terephthalate fibers may be used, but the present specification is not limited thereto.

In an electrolyte used in an embodiment of the present specification, a lithium salt, which may be included as the electrolyte, may be used without limitation as long as it is commonly used in an electrolyte for a secondary battery. An example of an anion of the lithium salt includes one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte used in the present specification, an organic solvent included in the electrolyte may be used without limitation as long as it is commonly used, and one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be typically used.

Particularly, ethylene carbonate and propylene carbonate, which are ring-type carbonates among the carbonate-based organic solvents, dissociate the lithium salt in the electrolyte well due to high dielectric constants as organic solvents with high viscosity, and thus may be preferably used. An electrolyte having high electrical conductivity may be prepared when the ring-type carbonate is mixed with a linear carbonate having low viscosity and a low-dielectric constant, such as dimethyl carbonate and diethyl carbonate, in a suitable ratio, and thus the ring-type carbonate may be more preferably used.

Selectively, the electrolyte stored according to an embodiment of the present specification may further include additives such as an overcharge inhibitor contained in conventional electrolytes.

A separator is disposed between the positive electrode and the negative electrode to form a battery structure, the battery structure is wound or folded to be placed in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

The invention claimed is:

1. A negative electrode active material, consisting of:
   particles represented by $SiO_a$ ($0<a<1$), wherein in the particles, a ratio of crystalline silicon and crystalline silica contained therein is expressed as $1-(a/2):(a/2)$, and wherein the particles represented by $SiO_a$ ($0<a<1$) consist of crystalline silicon and crystalline silica, and no amorphous silicon is present; and
   wherein each particle has a carbon coating layer distributed on a surface of each particle,
   wherein each particle has a bimodal pore structure inside each particle including mesopores and macropores,
   wherein a specific surface area of the negative electrode active material is in a range of 1 $m^2/g$ to 20 $m^2/g$, and
   wherein each particle has the bimodal pore structure formed uniformly from an inner central portion to a surface portion of each particle.

2. The negative electrode active material according to claim 1, wherein a diameter of the mesopores is in a range of 2 nm to 50 nm.

3. The negative electrode active material according to claim 1, wherein a diameter of the macropores is in a range of 50 nm to 700 nm.

4. The negative electrode active material according to claim 1, wherein a thickness of the carbon coating layer is in a range of 0.003 μm to 3.0 μm.

5. A secondary battery comprising the negative active material of claim 1.

* * * * *